United States Patent
Shimizu et al.

(10) Patent No.: US 12,202,571 B2
(45) Date of Patent: Jan. 21, 2025

(54) DRIVE UNIT AND ELECTRICALLY ASSISTED BICYCLE

(71) Applicant: YAMAHA HATSUDOKI KABUSHIKI KAISHA, Iwata (JP)

(72) Inventors: Tatsunori Shimizu, Shizuoka (JP); Ryota Suzuki, Shizuoka (JP); Tomohiro Usami, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 974 days.

(21) Appl. No.: 17/064,675

(22) Filed: Oct. 7, 2020

(65) Prior Publication Data
US 2021/0107591 A1    Apr. 15, 2021

(30) Foreign Application Priority Data
Oct. 11, 2019   (JP) ................................. 2019-187525

(51) Int. Cl.
| | |
|---|---|
| *B62M 6/55* | (2010.01) |
| *B62M 3/00* | (2006.01) |
| *F16C 9/02* | (2006.01) |
| *F16D 41/12* | (2006.01) |
| *F16D 41/30* | (2006.01) |

(52) U.S. Cl.
CPC ................ *B62M 6/55* (2013.01); *B62M 3/00* (2013.01); *F16C 9/02* (2013.01); *F16D 41/12* (2013.01); *F16D 41/30* (2013.01)

(58) Field of Classification Search
CPC .. B62M 6/55; F16C 9/02; F16D 41/12; F16D 41/30
See application file for complete search history.

(56) References Cited

U.S. PATENT DOCUMENTS

| | | | | |
|---|---|---|---|---|
| 1,615,534 | A | * | 1/1927 | Gunnar ................... F16D 41/12 74/156 |
| 4,437,553 | A | * | 3/1984 | Geisthoff ................ F16D 41/12 188/82.1 |
| 5,570,752 | A | * | 11/1996 | Takata ................... F16H 37/021 310/78 |
| 11,548,590 | B2 | * | 1/2023 | Usami ...................... B62M 6/45 |
| 2002/0166708 | A1 | | 11/2002 | Tseng |

(Continued)

FOREIGN PATENT DOCUMENTS

| | | |
|---|---|---|
| DE | 202014100111 U1 | 5/2014 |
| DE | 112018006005 T5 | 8/2020 |

(Continued)

OTHER PUBLICATIONS

102020123761, English translation (Year: 2021).*

*Primary Examiner* — Anne Marie M Boehler
(74) *Attorney, Agent, or Firm* — Keating & Bennett, LLP (57) ABSTRACT

A drive unit for an electrically assisted bicycle includes a one-way clutch including an inner member linked to an end of a connecting shaft and an outer member linked to a drive sprocket wheel. The inner member includes clutch pawls and a boss. The outer member includes clutch teeth that are able to engage with the clutch pawls and an extension to be coupled to the drive sprocket wheel. The extension includes a recess to accept the boss at an inner member side thereof. The recess has an inner peripheral surface that is able to slide against an outer peripheral surface of the boss.

4 Claims, 7 Drawing Sheets

(56) References Cited

U.S. PATENT DOCUMENTS

| | | | |
|---|---|---|---|
| 2006/0025279 A1* | 2/2006 | Kimes | F16D 47/04 475/324 |
| 2006/0081434 A1* | 4/2006 | Chen | F16D 41/30 192/64 |
| 2012/0097467 A1* | 4/2012 | Maeno | B62M 11/16 180/206.7 |
| 2014/0210318 A1 | 7/2014 | Yao | |
| 2015/0038289 A1* | 2/2015 | Hino | B62M 6/40 477/5 |
| 2017/0313383 A1 | 11/2017 | Uda et al. | |
| 2017/0356508 A1 | 12/2017 | Usami | |
| 2018/0216677 A1* | 8/2018 | Tamura | F16D 25/06 |
| 2019/0047659 A1 | 2/2019 | Usami | |
| 2019/0367127 A1 | 12/2019 | Noda et al. | |
| 2020/0398929 A1 | 12/2020 | Nishimori et al. | |
| 2022/0009588 A1 | 1/2022 | Kawakami et al. | |
| 2022/0081063 A1* | 3/2022 | Mercat | B62M 11/145 |

FOREIGN PATENT DOCUMENTS

| | | | |
|---|---|---|---|
| DE | 112019001328 T5 | 12/2020 | |
| DE | 102020123761 A1 * | 3/2021 | ............. B62J 50/30 |
| DE | 112019005674 T5 | 8/2021 | |
| EP | 0 807 570 A1 | 11/1997 | |
| JP | 09-301260 A | 11/1997 | |
| JP | 2005-225489 A | 8/2005 | |
| JP | 2007-030879 A | 2/2007 | |
| JP | 4612061 B2 | 1/2011 | |
| JP | 2011-189772 A | 9/2011 | |
| JP | 2014-196080 A | 10/2014 | |
| JP | 201719445 * | 1/2017 | ............. F16D 41/12 |
| JP | 2017-218104 A | 12/2017 | |
| JP | 2018-135022 A | 8/2018 | |
| JP | 2018-158695 A | 10/2018 | |
| JP | 2018-203223 A | 12/2018 | |
| JP | 2019-031257 A | 2/2019 | |
| JP | 2019-038422 A | 3/2019 | |
| JP | 2019-156186 A | 9/2019 | |
| JP | 2019206315 A | 12/2019 | |

* cited by examiner

DRIVE UNIT AND ELECTRICALLY ASSISTED BICYCLE

CROSS REFERENCE TO RELATED APPLICATIONS

This application claims the benefit of priority to Japanese Patent Application No. 2019-187525 filed on Oct. 11, 2019. The entire contents of this application are hereby incorporated herein by reference.

BACKGROUND OF THE INVENTION

1. Field of the Invention

The present invention relates to a drive unit mountable to a body frame of an electrically assisted bicycle. The present invention also relates to an electrically assisted bicycle including such a drive unit.

2. Description of the Related Art

Bicycles are widely prevalent as casual means of transportation, regardless of age and gender. In recent years, electrically assisted bicycles in which a driving power from an electric motor is utilized to assist the pedaling force of a rider have become more and more prevalent. Electrically assisted bicycles are disclosed in Japanese Laid-Open Patent Publication No. 2014-196080, for example.

An electrically assisted bicycle has a drive unit including an electric motor and the like. One known type of drive unit is a type which is located within the hub of the rear wheel, and another is a type which is mounted at the lower end of the body frame (near the bottom bracket). The latter type of drive unit has become predominant in recent years.

The electrically assisted bicycle disclosed in Japanese Laid-Open Patent Publication No. 2014-196080 includes a drive unit which is mounted at the lower end of the body frame. This drive unit includes a housing, an electric motor, a pedal crank shaft, and the like.

The electric motor, which is accommodated in the housing, generates a driving power that is utilized to assist the pedaling force of a rider. The pedal crank shaft extends through the housing along the vehicle's right-left direction. Via arms, pedals are mounted to the pedal crank shaft. Within the housing, the pedal crank shaft is rotatably supported by a pair of bearings. Rotation of the pedal crank shaft is transmitted to the rear wheel via a drive sprocket wheel, a chain, a driven sprocket wheel, and the like.

The drive unit further includes a one-way clutch that is provided around the pedal crank shaft. While allowing any force that causes the drive sprocket wheel to rotate in the forward-rotation direction to be transmitted to the drive sprocket wheel, the one-way clutch prevents any force that would cause the drive sprocket wheel to rotate in the backward-rotation direction from being transmitted to the drive sprocket wheel. Moreover, the one-way clutch prevents the pedal crank shaft from rotating in the forward-rotation direction due to a driving power that is generated by the electric motor.

As such a one-way clutch, a one-way clutch having a ratchet mechanism may be adopted. A ratchet mechanism includes a plurality of clutch pawls and a plurality of clutch teeth. For example, the plurality of clutch pawls may be provided on an inner member of the one-way clutch, while the plurality of clutch teeth may be provided on an outer member thereof. As the inner member and the outer member undergo relative rotations with respect to each other, the clutch pawls engage with the clutch teeth, such that rotation of the pedal crank shaft is transmitted to the drive sprocket wheel.

When the one-way clutch needs to be reduced in weight and production cost, one may decrease the number of clutch pawls. However, decreasing the number of clutch pawls may allow a center misalignment to occur between the inner member and the outer member, thus resulting in a problem of decreased accuracy of engagement between the clutch pawls and the clutch teeth.

SUMMARY OF THE INVENTION

Preferred embodiments of the present invention provide drive units each of which allows a one-way clutch to rotate stably, and electrically assisted bicycles including such drive units.

A drive unit according to a preferred embodiment of the present invention is mountable to a body frame of an electrically assisted bicycle to generate a driving power which is transmitted to a wheel of the electrically assisted bicycle, the drive unit including a housing; an electric motor fixed to the housing; a pedal crank shaft extending through the housing along a right-left direction of the electrically assisted bicycle and being rotatably supported by the housing; a connecting shaft through which the pedal crank shaft extends and which transmits a pedaling force from a first end to a second end thereof, the first end being coupled to the pedal crank shaft; and a one-way clutch to transmit the pedaling force from the second end of the connecting shaft to a drive sprocket wheel; wherein the one-way clutch includes an inner member linked to the second end of the connecting shaft, and an outer member linked to the drive sprocket wheel; the inner member includes a plurality of clutch pawls to restrict rotation of the outer member relative to the inner member in one direction, a base on which the plurality of clutch pawls are provided, and a boss protruding from one end of the base toward a side where the drive sprocket wheel is located to cause a center axis of the outer member to be aligned with a center axis of the inner member; the outer member includes a plurality of clutch teeth able to engage with the plurality of clutch pawls, and an extension coupled to the drive sprocket wheel; and the extension includes a recess to accommodate the boss at an inner member side thereof, and the recess includes an inner peripheral surface that is able to slide against an outer peripheral surface of the boss.

Providing a "boss/recess" spigot joint structure between the inner member and the outer member of the one-way clutch achieves center alignment between the inner member and the outer member. As a result, even when the clutch pawls and the clutch teeth have a configuration that may experience center misalignment, the one-way clutch is stably rotated. Since the outer peripheral surface of the boss and the inner peripheral surface of the recess are able to slide against each other, while achieving center alignment, one of the inner member and the outer member is able to undergo a relative rotation with respect to the other.

In a preferred embodiment of the present invention, a size of the boss along a direction parallel to the center axis of the inner member is, for example, about 2 mm or more.

A greater size (length) of the boss enhances the function of significantly reducing or preventing misalignment between the center axes due to inclination the inner member and the outer member. Moreover, about 1 mm of play along the crank shaft direction may be expected between parts such that, even in the presence of such play, the boss is able to be prevented from becoming disengaged from the recess.

In a preferred embodiment of the present invention, of the inner member, a thickness (t2) defined by a difference between an outer diameter and an inner diameter of the base is greater than a thickness (t1) defined by a difference between an outer diameter and an inner diameter at the second end of the connecting shaft.

This enables increasing the strength of the base (on which the clutch pawls are provided) without being constrained by the mechanical properties of the connecting shaft on which a magnetostrictive torque sensor is mounted. Therefore, even if there are two clutch pawls, for example, the base is provided sufficient strength to withstand the large force that may be applied through each individual clutch pawl.

In a preferred embodiment of the present invention, when the inner member rotates the outer member, only two of the plurality of clutch pawls that are located diametrically across the inner member are able to engage with corresponding ones of the plurality of clutch teeth.

Since the spigot joint structure significantly reduces or prevents center misalignment between the inner member and the outer member, even if there are as few as two clutch pawls to engage, too much force is prevented from being applied to one of the clutch pawls thus allowing stable rotation.

In a preferred embodiment of the present invention, the plurality of clutch pawls of the inner member consist of two clutch pawls.

The clutch has a simple configuration and therefore is reduced in weight. In addition, the number of parts in the clutch is reduced and also assembly of the clutch is simplified, thus reducing costs.

In a preferred embodiment of the present invention, the boss is located closer to the pedal crank shaft than to the plurality of clutch pawls.

The outer diameter of the boss may be smaller than the outer diameter of the base. The reduced diameter of the boss allows the clutch to be reduced in weight.

In a preferred embodiment of the present invention, a plain bearing is located between the outer member and the pedal crank shaft, and no plain bearing is located between the inner member and the pedal crank shaft.

This allows the number of plain bearings to be reduced, thus decreasing the cost of parts.

In a preferred embodiment of the present invention, a gap is provided between an inner peripheral surface of the inner member and an outer peripheral surface of the pedal crank shaft.

Since contact between the inner peripheral surface of the inner member and the outer peripheral surface of the pedal crank shaft is avoided, a step of polishing the outer peripheral surface of the pedal crank shaft to a slidable level is able to be omitted.

In a preferred embodiment of the present invention, only one plain bearing is located between the outer member and the pedal crank shaft.

This allows the cost of parts associated with plain bearings to be further reduced.

In a preferred embodiment of the present invention, the outer member includes a gear to receive an assisting driving power from the electric motor, and the outer member transmits to the drive sprocket wheel a resultant force that combines the pedaling force having been transmitted to the second end of the connecting shaft and the assisting driving power from the electric motor.

This achieves a uniaxial system in which forces are merged at the outer member before being transmitted to the drive sprocket wheel.

An electrically assisted bicycle according to a preferred embodiment of the present invention includes a drive unit according to any of the above preferred embodiments of the present invention.

Even when the clutch pawls and the clutch teeth of the one-way clutch have a configuration that may experience center misalignment, the electrically assisted bicycle is able to provide stable rotation of the one-way clutch.

According to a preferred embodiment of the present invention, providing a "boss/recess" spigot joint structure between the inner member and the outer member of the one-way clutch achieves center alignment between the inner member and the outer member. As a result, even when the clutch pawls and the clutch teeth have a configuration that may allow center misalignment, the one-way clutch is stably rotated. Since the outer peripheral surface of the boss and the inner peripheral surface of the recess are able to slide against each other, while achieving center alignment, one of the inner member and the outer member is able to undergo a relative rotation with respect to the other.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, with reference to the drawings, drive systems according to preferred embodiments of the present invention, and electrically assisted bicycles including such drive systems according to other preferred embodiments of the present invention, will be described. In the description of the preferred embodiments, like component elements will be denoted by like reference numerals, and any redundant description thereof will be omitted. In preferred embodiments of the present invention, the terms "front", "rear", "right", "left", "up", and "down" respectively mean the front, rear, right, left, up, and down as viewed from a rider who sits on the saddle (seat) of the electrically assisted bicycle while facing the handle bar. The following preferred embodiments are only illustrative, and the present invention is not limited to the following preferred embodiments.

Figure 1:
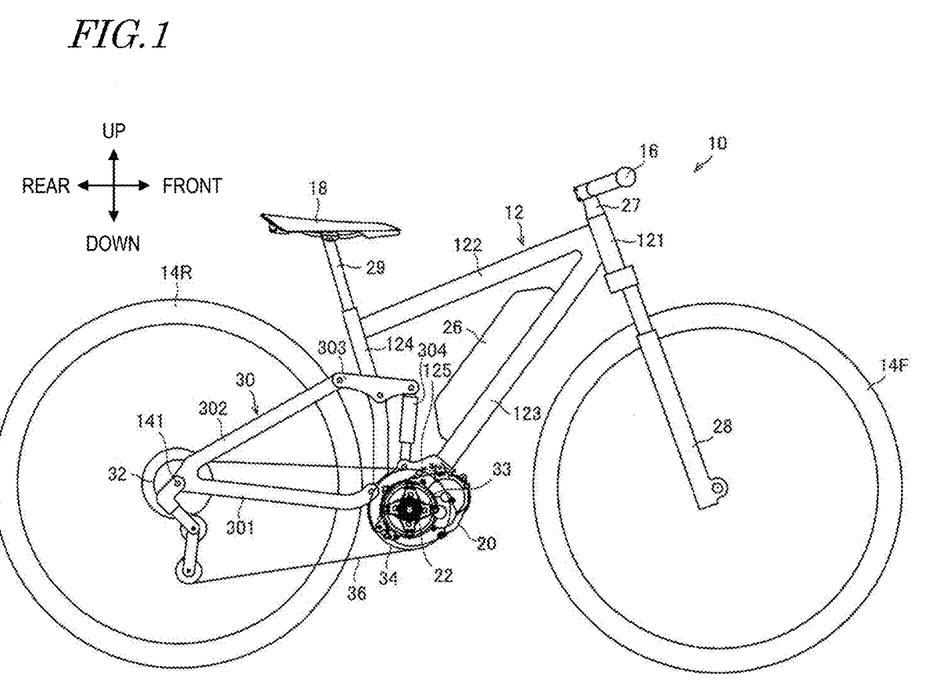
FIG. 1 is a right side view showing an electrically assisted bicycle 10 according to a preferred embodiment of the present invention.

With reference to FIG. 1, an electrically assisted bicycle 10 according to a preferred embodiment of the present invention will be described. FIG. 1 is a right side view showing the schematic configuration of the electrically assisted bicycle 10.

The electrically assisted bicycle 10 includes a body frame 12, a front wheel 14F, a rear wheel 14R, a handle bar 16, and a saddle 18. The electrically assisted bicycle 10 further includes a drive unit 20 and a battery unit 26.

The body frame 12 includes a head tube 121, a top tube 122, a down tube 123, a seat tube 124, and a bracket 125.

The head tube 121, extending along the up-down direction, is located at the front of the body frame 12. A stem 27 is inserted in the head tube 121 so as to be able to rotate. The handle bar 16 is fixed at the upper end of the stem 27. Front forks 28 are fixed at the lower end of the stem 27. At the lower end of the front forks 28, the front wheel 14F is mounted so as to be able to rotate. In other words, the front wheel 14F is supported by the body frame 12 via the stem 27 and the front forks 28.

The top tube 122, extending along the front-rear direction, is located at the rear of the head tube 121. The front end of the top tube 122 is connected to the head tube 121. The rear end of the top tube 122 is connected to the seat tube 124.

The down tube 123, extending along the front-rear direction, is located at the rear of the head tube 121. The down tube 123 is located below the top tube 122. The front end of the down tube 123 is connected to the head tube 121. In the example shown in FIG. 1, the front end portion of the down tube 123 is also connected to the front end portion of the top tube 122. The rear end of the down tube 123 is connected to the bracket 125.

The battery unit 26 is mounted on the down tube 123. The battery unit 26 supplies electric power to the drive unit 20. The battery unit 26 includes a battery and a control circuit. The battery is a rechargeable battery that is able to be charged and discharged. The control circuit controls charging and discharging of the battery, and also monitors the output current, remaining power, etc., of the battery.

The seat tube 124, extending along the up-down direction, is located at the rear of the top tube 122 and the down tube 123. The lower end of the seat tube 124 is connected to the bracket 125. In other words, the seat tube 124 extends upward from the bracket 125.

In the example shown in FIG. 1, the seat tube 124 is bent at an intermediate portion along the up-down direction. As a result of this, a lower portion of the seat tube 124 extends along the up-down direction, while an upper portion of the seat tube 124 extends along a direction which is inclined with respect to the up-down direction.

A seat post 29 is inserted in the seat tube 124. The saddle 18 is mounted at the upper end of the seat post 29.

The bracket 125 is located at the lower end of the body frame 12. The bracket 125 supports the drive unit 20. The drive unit 20 mounted on the body frame 12 generates a driving power to be transmitted to a wheel (which herein is the rear wheel 14R). Details of the drive unit 20 will be described below.

The body frame 12 further includes a swingarm 30, a pair of connection arms 303, and a suspension 304. The swingarm 30 includes a pair of chain stays 301 and a pair of seat stays 302.

The pair of chain stays 301 each extend along the front-rear direction. The pair of chain stays 301 are located side-by-side along the right-left direction. The rear wheel 14R is located between the pair of chain stays 301. The pair of chain stays 301 are positioned symmetrically to the right and left. For this reason, FIG. 1 only illustrates the right chain stay 301.

The front end portion of each chain stay 301 is mounted to the bracket 125. In other words, each chain stay 301 extends rearward from the bracket 125. Each chain stay 301 is able to swing with respect to the bracket 125 around an axis which extends along the right-left direction.

A wheel axis 141 of the rear wheel 14R is mounted at the rear end portion of each chain stay 301 in such a manner that the wheel axis 141 itself is unable to rotate. In other words, the pair of chain stays 301 together support the rear wheel 14R in such a manner that the rear wheel 14R is able to rotate around the wheel axis 141. That is, the rear wheel 14R is supported on the body frame 12. A plurality of driven sprocket wheels 32 are fixed on the rear wheel 14R.

The pair of seat stays 302 each extend along the front-rear direction. The pair of seat stays 302 are located side-by-side along the right-left direction. The rear wheel 14R is located between the pair of seat stays 302. The pair of seat stays 302 are positioned symmetrically to the right and left. For this reason, FIG. 1 only illustrates the right seat stay 302.

The rear end portion of the left seat stay 302 is connected to the rear end portion of the left chain stay 301. The rear end portion of the right seat stay 302 is connected to the rear end portion of the right chain stay 301.

The pair of connection arms 303 each extend along the front-rear direction. The pair of connection arms 303 are located side-by-side along the right-left direction. The seat tube 124 is located between the pair of connection arms 303. The pair of connection arms 303 are positioned symmetrically to the right and left. For this reason, FIG. 1 only illustrates the right connection arm 303.

Each connection arm 303 is mounted on the seat tube 124. Each connection arm 303 is able to swing with respect to the seat tube 124 around an axis which extends along the right-left direction.

As viewed from a side surface of the vehicle, the front end of each connection arm 303 is located forward of the seat tube 124. As viewed from a side surface of the vehicle, the rear end of each connection arm 303 is located rearward of the seat tube 124.

The rear end portion of the left connection arm 303 is mounted at the front end portion of the left seat stay 302. The left connection arm 303 is able to swing with respect to the left seat stay 302 around an axis which extends along the right-left direction.

The rear end portion of the right connection arm 303 is mounted at the front end portion of the right seat stay 302. The right connection arm 303 is able to swing with respect to the right seat stay 302 around an axis which extends along the right-left direction.

The suspension 304 is located forward of the seat tube 124 and rearward of the down tube 123. The upper end portion of the suspension 304 is mounted on the pair of connection arms 303. The suspension 304 is able to swing with respect to the pair of connection arms 303 around an axis which extends along the right-left direction. The lower end portion of the suspension 304 is mounted on the bracket 125. The suspension 304 is able to swing with respect to the bracket 125 around an axis which extends along the right-left direction. The position at which the bracket 125 is mounted to the suspension 304 lies forward of the position at which the bracket 125 is mounted to the seat tube 124.

Via a supporting member 33, a drive sprocket wheel 34 is mounted on the drive unit 20. A chain 36 is wound around the drive sprocket wheel 34 and the driven sprocket wheels 32.

Figure 2:
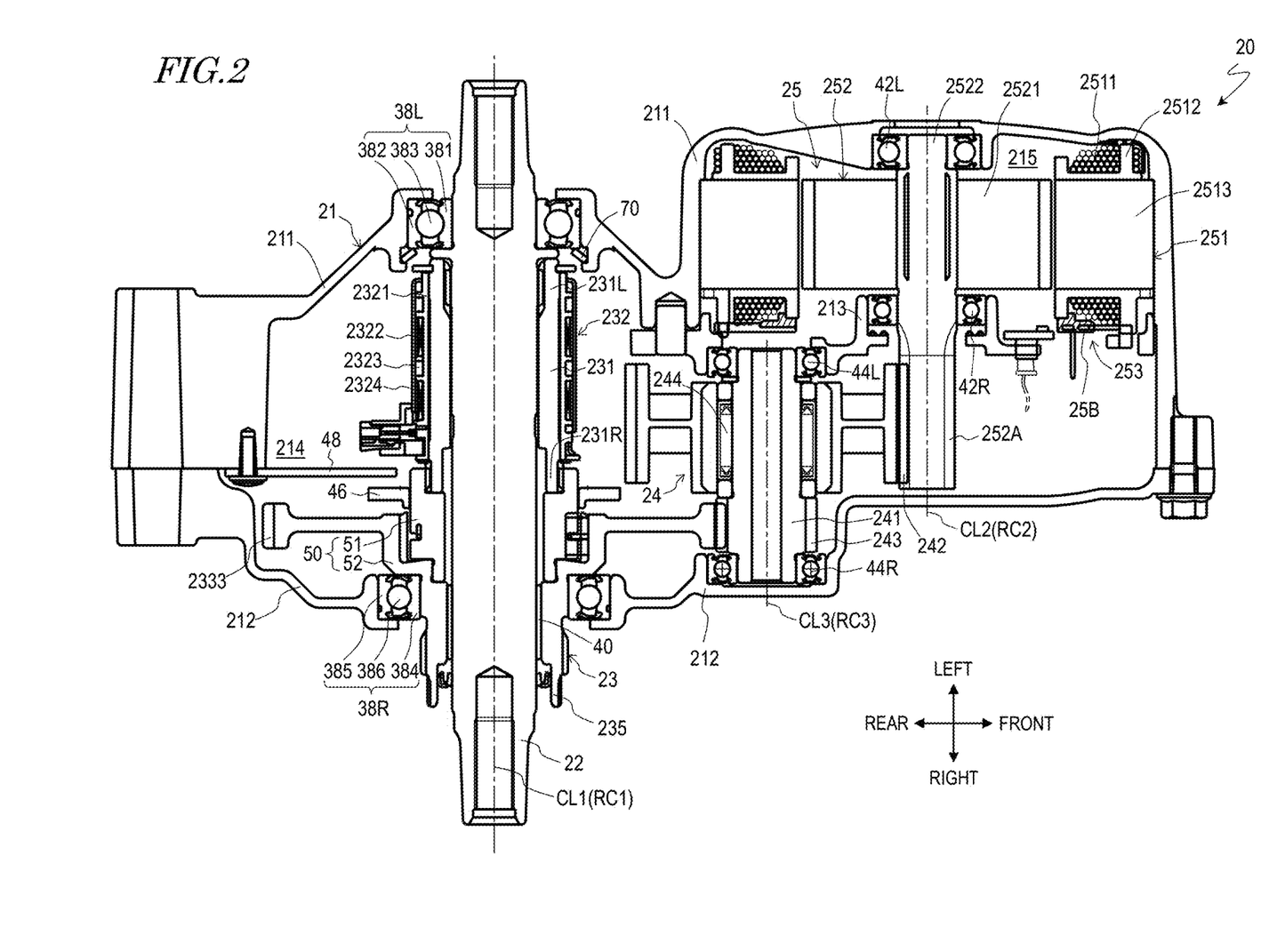
FIG. 2 is a cross-sectional view showing an internal structure of a drive unit 20 which is included in an electrically assisted bicycle 10 according to a preferred embodiment of the present invention.

With reference to FIG. 2, an exemplary configuration of the drive unit 20 will be described. FIG. 2 is a cross-sectional view showing the internal structure of the drive unit 20.

As shown in FIG. 2, the drive unit 20 includes a housing 21, a pedal crank shaft 22, a rotary shaft (axle) 23, a speed reducer 24, and an electric motor 25.

First, the configuration of the housing 21 according to a preferred embodiment of the present invention will be described.

The housing 21 is fixed to the bracket 125 (FIG. 1) by a plurality of fastening members. The housing 21 includes a first case 211, a second case 212, and an inner cover 213. The first case 211, the second case 212, and the cover 213 are each preferably made of a metal material (e.g., an aluminum alloy).

In terms of the right-left direction, the second case 212 is overlaid on the first case 211 from the right. The first case 211 is fixed to the second case 212 by a plurality of fastening members. As a result, a space 214 is provided between the first case 211 and the second case 212.

In terms of the right-left direction, the inner cover 213 is overlaid from the right to close the recess of the first case 211 in which the electric motor 25 is accommodated. The inner cover 213 is fixed to the first case 211 by a plurality of fastening members. As a result, between the left portion of the first case 211 and the inner cover 213, a space 215 that is covered by the first case 211 and the inner cover 213 is provided. The electric motor 25 is accommodated in the space 215.

Next, the configuration of the pedal crank shaft 22 according to a preferred embodiment of the present invention will be described.

The pedal crank shaft 22 extends through the housing 21 along the vehicle's right-left direction. In other words, the center axis CL1 of the pedal crank shaft 22 extends along the right-left direction. As viewed along the axial direction (thrust direction) of the pedal crank shaft 22, the center axis CL1 defines the axis of rotation RC1 of the pedal crank shaft 22. The pedal crank shaft 22 rotates with respect to the housing 21 around the center axis CL1.

The pedal crank shaft 22 is rotatably supported by a pair of bearings 38L and 38R within the housing 21. One (38L) of the pair of bearings 38L and 38R is located at one end along the thrust direction (which herein is the left side), hereinafter referred to as the "first bearing". On the other hand, the other (38R) of the pair of bearings 38L and 38R is located at the other end (which herein is the right side) along the thrust direction, hereinafter referred to as the "second bearing".

The first bearing 38L is preferably a roller bearing that includes an inner ring 381, an outer ring 382, and a rolling element 383. The first bearing 38L does not move along the thrust direction relative to the pedal crank shaft 22. In the example shown in FIG. 2, the inner ring 381 of the first bearing 38L is press-fitted to the pedal crank shaft 22. The outer ring 382 of the first bearing 38L is urged in the left direction by an elastic member 70.

The second bearing 38R is preferably a roller bearing that includes an inner ring 384, an outer ring 385, and a rolling element 386. The second bearing 38R rotatably supports the pedal crank shaft 22, via an outer member 52 of a one-way clutch 50 and a plain bearing(s) 40, which will be described below.

The pedal crank shaft 22 extends through the rotary shaft 23. The rotary shaft 23 is accommodated in the housing 21. Details of the rotary shaft 23 will be described below. The pedal crank shaft 22 includes a pair of right- and left-crank arms (not shown) mounted thereto. Pedals (not shown) are mounted on the crank arms.

Next, the configurations of the electric motor 25 and the speed reducer 24 according to a preferred embodiment of the present invention will be described.

The electric motor 25 is accommodated in, and fixed to, the housing 21. The electric motor 25 generates a driving power which assists the travel of the electrically assisted bicycle 10. The electric motor 25 includes a stator 251 and a rotor 252.

The stator 251 includes a plurality of (e.g., fourteen) bobbins 2512, around which coils 2511 are wound. An iron core 2513 is inserted in each bobbin 2512. The stator 251 is located in the space 215. In this state, the stator 251 is fixed to the first case 211.

A supporting member 253 is mounted on the stator 251. The supporting member 253 is preferably made of a resin material. A plurality of busbars 25B are embedded in the supporting member 253. Each busbar 25B is connected to a corresponding coil 2511. By controlling power to the busbars 25B, a magnetic force is generated in the stator 251.

The rotor 252 is located inside the stator 251. The center axis CL2 of the rotor 252 is parallel or substantially parallel to the center axis CL1 of the pedal crank shaft 22. In other words, the rotor 252 is parallel or substantially parallel to the pedal crank shaft 22. As viewed along the axial direction of the pedal crank shaft 22, the center axis CL2 defines the axis of rotation RC2 of the rotor 252.

The rotor 252 includes a rotor main body 2521 and an output shaft 2522. These will now be described. The outer peripheral surface of the rotor main body 2521 is alternately magnetized into N-poles and S-poles along the peripheral direction. In the present preferred embodiment, there are seven N-poles and seven S-poles.

The output shaft 2522 extends through the rotor main body 2521. The output shaft 2522 is fixed to the rotor main body 2521. In other words, the output shaft 2522 rotates together with the rotor main body 2521.

With the two bearings 42L and 42R, the output shaft 2522 is supported so as to be able to rotate relative to the housing 21 around the center axis CL2. The bearing 42L is fixed to the first case 211. The bearing 42R is located farther to the right side than is the rotor main body 2521, and is fixed to the inner cover 213. The output shaft 2522 extends through the inner cover 213. In a portion of the output shaft 2522 that is located in the space 214, an output gear 252A is provided. The output gear 252A is a helical gear, for example.

The speed reducer 24 is accommodated in the housing 21. Specifically, the speed reducer 24 is located within the space 214. The speed reducer 24 includes a transmission shaft 241, a first transmission gear 242, and a second transmission gear 243. The transmission shaft 241 is a gear rotary shaft.

The transmission shaft 241 is located in the housing 21. The center axis CL3 of the transmission shaft 241 is parallel or substantially parallel to the center axis CL1 of the pedal crank shaft 22. In other words, the transmission shaft 241 extends parallel or substantially parallel to the center axis CL1 of the pedal crank shaft 22. As viewed along the axial direction of the transmission shaft 241, i.e., the axial direction of the pedal crank shaft 22, the center axis CL3 defines the axis of rotation RC3 of the transmission shaft 241.

With the two bearings 44L and 44R, the transmission shaft 241 is supported so as to be able to rotate around the center axis CL3. The bearing 44L is fixed to the inner cover 213. The bearing 44R is fixed to the second case 212.

The first transmission gear 242 is preferably made of a resin material, for example. The first transmission gear 242 is provided on the transmission shaft 241. The first transmission gear 242 is located closer to the bearing 44L than to the bearing 44R along the axial direction of the transmission shaft 241. The first transmission gear 242 meshes with the output gear 252A. As a result, a driving power which is generated by the electric motor 25 is transmitted from the output gear 252A to the first transmission gear 242. Between the first transmission gear 242 and the transmission shaft 241, a one-way clutch 244 is provided. As a result, the rotary force of the output gear 252A in the forward-rotation direction is transmitted to the transmission shaft 241 via the first transmission gear 242, while the rotary force of the output gear 252A in the backward-rotation direction is not transmitted to the transmission shaft 241. Moreover, the one-way clutch 244 prevents the rotary force of the pedal crank shaft 22 in the forward-rotation direction that is generated by the human force of the rider from being transmitted to the electric motor 25. The first transmission gear 242 is larger in diameter than the output gear 252A, and has more teeth than does the output gear 252A. In other words, the speed of the first transmission gear 242 is slower than that of the output gear 252A.

The second transmission gear 243 is preferably made of a metal material (e.g., iron). The second transmission gear 243 is provided on the transmission shaft 241. The second transmission gear 243 is located at a different position from the first transmission gear 242 along the axial direction of the transmission shaft 241. In the present preferred embodiment, the transmission shaft 241 and the second transmission gear 243 are monolithic, i.e., a single unitary piece. The second transmission gear 243 rotates together with the transmission shaft 241. Note that the second transmission gear 243 may be fixed to the transmission shaft 241 via a serration coupling (or press-fitting).

The rotary shaft 23 is coaxial with the pedal crank shaft 22, and is able to rotate with the pedal crank shaft 22. The rotary shaft 23 includes a connecting shaft 231 and a one-way clutch 50.

The connecting shaft 231 has a cylindrical shape. The pedal crank shaft 22 is inserted in the connecting shaft 231. The connecting shaft 231 is coaxial with the crank shaft 22.

The left end (i.e., first end) 231 of the connecting shaft 231 is linked to the pedal crank shaft 22 via a serration coupling or the like. As a result, regardless of whether the pedal crank shaft 22 rotates in the forward-rotation direction or the backward-rotation direction, the connecting shaft 231 rotates together with the crank shaft 22.

A torque detector 232 is provided around the connecting shaft 231. The torque detector 232 is supported by the first case 211.

The torque detector 232 detects a torque that occurs in the connecting shaft 231 as the driver moves the pedals. The torque detector 232 is preferably a magnetostrictive type. The torque detector 232 outputs a signal which is in accordance with the detected torque to a controller which is mounted on the circuit board 48. By referring to the torque signal which has been detected by the torque detector 232, the controller determines the state of pedaling by the driver, and thus controls the electric motor 25.

The torque detector 232 includes an attachment shaft 2321, a coil 2322, a detection element 2323, and a shield 2324.

The attachment shaft 2321 is mounted on the outer peripheral surface of the connecting shaft 231, and is able to relatively rotate with respect to the connecting shaft 231. The coil 2322 is provided on the outer peripheral surface of the attachment shaft 2321. A predetermined voltage is applied to the coil 2322. The detection element 2323 detects a change in voltage of the coil 2322 that is caused by distortion of the connecting shaft 231. As a result, a torque occurring in the connecting shaft 231, i.e., a torque occurring in the pedal crank shaft 22 rotating integrally with the connecting shaft 231, is detected. The shield 2324 prevents deterioration of the detection accuracy of the detection element 2323. The shield 2324 does not rotate with the connecting shaft 231.

Next, the configuration of the one-way clutch 50 according to a preferred embodiment of the present invention will be described.

Along the axial direction of the pedal crank shaft 22, the one-way clutch 50 is located on the right side of the torque detector 232. The one-way clutch 50 is coaxial with the pedal crank shaft 22. The one-way clutch 50 includes an inner member 51 and an outer member 52.

The inner member 51 has a cylindrical shape. At the left end (i.e., the first end) of the inner member 51, the right end (i.e., the second end) 231R of the connecting shaft 231 is inserted. The inner member 51 is coaxial with the connecting shaft 231. In this state, the right end 231R of the connecting shaft 231 is linked to the left end of the inner member 51 via a serration coupling or the like. As a result, regardless of whether the connecting shaft 231 rotates in the forward-rotation direction or the backward-rotation direction, the inner member 51 rotates together with the connecting shaft 231. In other words, regardless of whether the pedal crank shaft 22 rotates in the forward-rotation direction or the backward-rotation direction, the inner member 51 rotates together with the pedal crank shaft 22. The connecting shaft 231 and the inner member 51 function as a crank rotation inputting shaft that rotates integrally with the pedal crank shaft 22.

A ring magnet 46 is fixed to the outer peripheral surface of the inner member 51. As viewed along the axial direction of the pedal crank shaft 22, the ring magnet 46 is located at a position that overlaps a portion of the circuit board 48.

The ring magnet 46 rotates together with the inner member 51. By using a detection element provided on the circuit board 48 to detect a change in the magnetic field that is caused by the rotation of the ring magnet 46, rotation of the pedal crank shaft 22 is detected.

The outer member 52 has a cylindrical shape. The pedal crank shaft 22 is inserted in the outer member 52. The plain bearing(s) is located between the outer member 52 and the pedal crank shaft 22. As a result of this, the outer member 52 is able to rotate coaxially with the pedal crank shaft 22.

Between the outer member 52 and the inner member 51, a ratchet mechanism as a one-way clutch mechanism is provided. As a result, a rotary force of the inner member 51 in the forward-rotation direction is transmitted to the outer member 52, while the rotary force of the inner member 51 in the backward-rotation direction is not transmitted to the outer member 52. Moreover, a rotary force of the outer member 52 in the forward-rotation direction that has occurred through the rotation of the electric motor 25 is not transmitted to the inner member 51.

The outer member 52 is supported by the second bearing 38R so as to be able to rotate relative to the housing 21 around the center axis CL1 of the pedal crank shaft 22. The outer ring 385 of the second bearing 38R is free-fitted to the second case 212, with the inner ring 384 thereof being press-fitted to the outer member 52 of the one-way clutch 50.

The outer member 52 extends through the second case 212. The drive sprocket wheel 34 (FIG. 1) is mounted to a portion of the outer member 52 that is located outside (i.e., on the right side of) the housing 21, via the supporting member 33 (FIG. 1).

The outer member 52 includes a gear 2333. The gear 2333 meshes with a second transmission gear 243 of the speed reducer 24. The gear 2333 is larger in diameter than the second transmission gear 243, and has more teeth than does the second transmission gear 243. That is, the rotational speed of the gear 2333 is slower than the rotational speed of the second transmission gear 243.

The outer member 52 transmits a resultant force combining a human force (pedaling force) which is transmitted to the second end 231R of the connecting shaft 231 and an assisting driving power from the electric motor 25 to the drive sprocket wheel 34. With the outer member 52, a resultant force outputting shaft 235 outputs a resultant force combining the human force which is input via the one-way clutch 50 and the assisting driving power which is input via the gear 2333. The resultant force outputting shaft 235 is included in the rotary shaft 23.

Hereinafter, with reference to FIG. 3 to FIG. 7, the configuration and operation of the one-way clutch 50 will be described in more detail.

Figure 3:
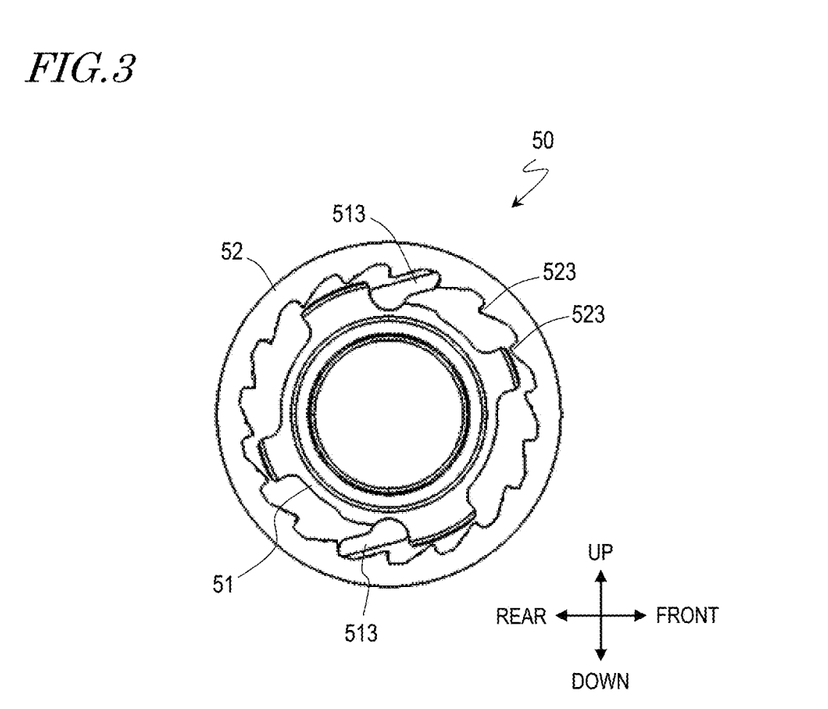
FIG. 3 is a diagram showing an exemplary internal structure of a one-way clutch 50 according to a preferred embodiment of the present invention.

First, see FIG. 3. FIG. 3 is a diagram showing an exemplary internal structure of the one-way clutch 50. As described above, the one-way clutch 50 includes a ratchet mechanism. The inner member 51 of the one-way clutch 50 includes a plurality of clutch pawls 513. The plurality of clutch pawls 513 are provided in an outer peripheral portion of the inner member 51. The outer member 52 of the one-way clutch 50 includes a plurality of clutch teeth 523. The plurality of clutch teeth 523 are provided in an inner peripheral portion of the outer member 52. The clutch pawls 513 and the clutch teeth 523 are able to engage with each other.

Each of the plurality of clutch pawls 513 is swingingly supported by the inner member 51. Each of the plurality of clutch pawls 513 is urged outward along the radial direction by an elastic member (not shown), thus abutting with the inner peripheral portion of the outer member 52. Each of the plurality of clutch pawls 513 may engage with one of the plurality of clutch teeth 523. When the inner peripheral portion of the outer member 52 shown in FIG. 3 is viewed in the counterclockwise direction, each of the plurality of clutch teeth 523 presents a sawtooth shape which rises gently but falls steeply.

In the one-way clutch 50 shown in FIG. 3, when the inner member 51 rotates right relative to the outer member 52, the clutch pawls 513 engage with the steep portions of the sawtooth-shaped clutch teeth 523. Once the clutch pawls 513 and the clutch teeth 523 engage, rotation of the inner member 51 is transmitted to the outer member 52.

On the other hand, when the inner member 51 rotates left relative to the outer member 52, the clutch pawls 513 slide along the surface of the sawtooth-shaped clutch teeth 523, and do not engage with the clutch teeth 523. Since the clutch pawls 513 and the clutch teeth 523 do not engage, rotation of the inner member 51 is not transmitted to the outer member 52. With such structure, the one-way clutch 50 is able to only transmit rotation in one direction.

In the example shown in FIG. 3, the inner member 51 includes two clutch pawls 513. The two clutch pawls 513 are located diametrically across the inner member 51. In other words, the two clutch pawls 513 are located on a straight line through the center of the inner member 51. By reducing the number of clutch pawls 513 to two, the one-way clutch 50 has a simple configuration, and is reduced in weight. In addition, the number of parts in the one-way clutch 50 is reduced and also assembly of the one-way clutch 50 is simplified, thus reducing costs.

However, when the number of clutch pawls 513 is as few as two, there is a problem in that a misalignment between the center axis of the inner member 51 and the center axis of the outer member 52 (i.e., a center misalignment) may occur. When the number of clutch pawls 513 is three or more, the clutch pawls 513 and the clutch teeth 523 will engage at three or more points, such that the center axis of the inner member 51 and the center axis of the outer member 52 will match relatively accurately (i.e., a center alignment is achieved). On the other hand, when the number of clutch pawls 513 is two, it may be difficult to achieve a center alignment between both members by only the engagement of the clutch pawls 513 and the clutch teeth 523, thus possibly resulting in a low accuracy of engagement between the clutch pawls 513 and the clutch teeth 523. As a result, the load on the two clutch pawls 513 may not be equalized, and one of the clutch pawls 513 may have increased wear, thus shortening the product life.

The drive unit 20 according to a preferred embodiment of the present invention has a structure that allows the one-way clutch 50 to rotate stably even if the clutch pawls 513 and the clutch teeth 523 have a configuration that may allow center misalignment. Hereinafter, this structure will be described in detail.

Figure 4:
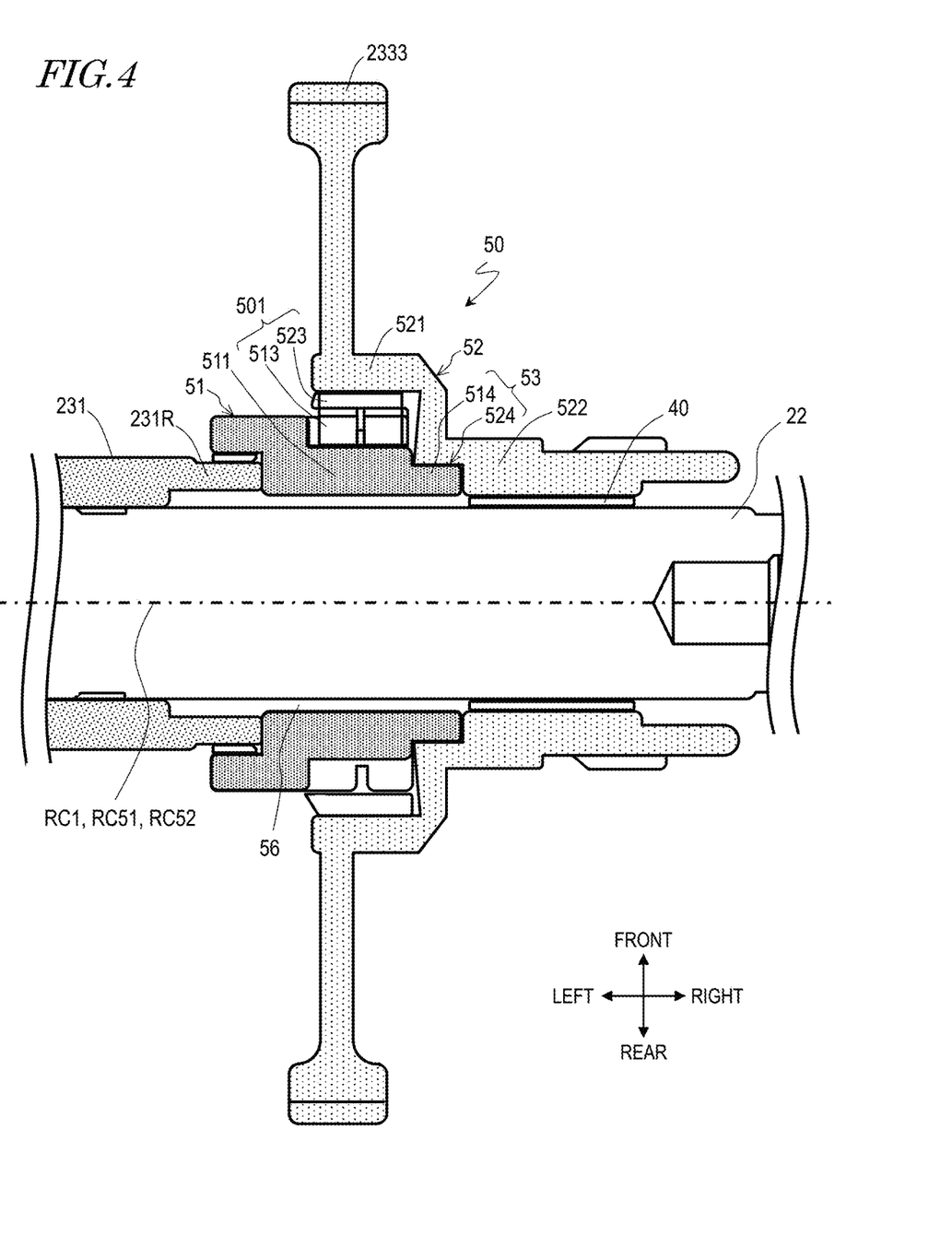
FIG. 4 is a cross-sectional view showing an exemplary configuration of a one-way clutch 50 according to a preferred embodiment of the present invention.
Figure 5:
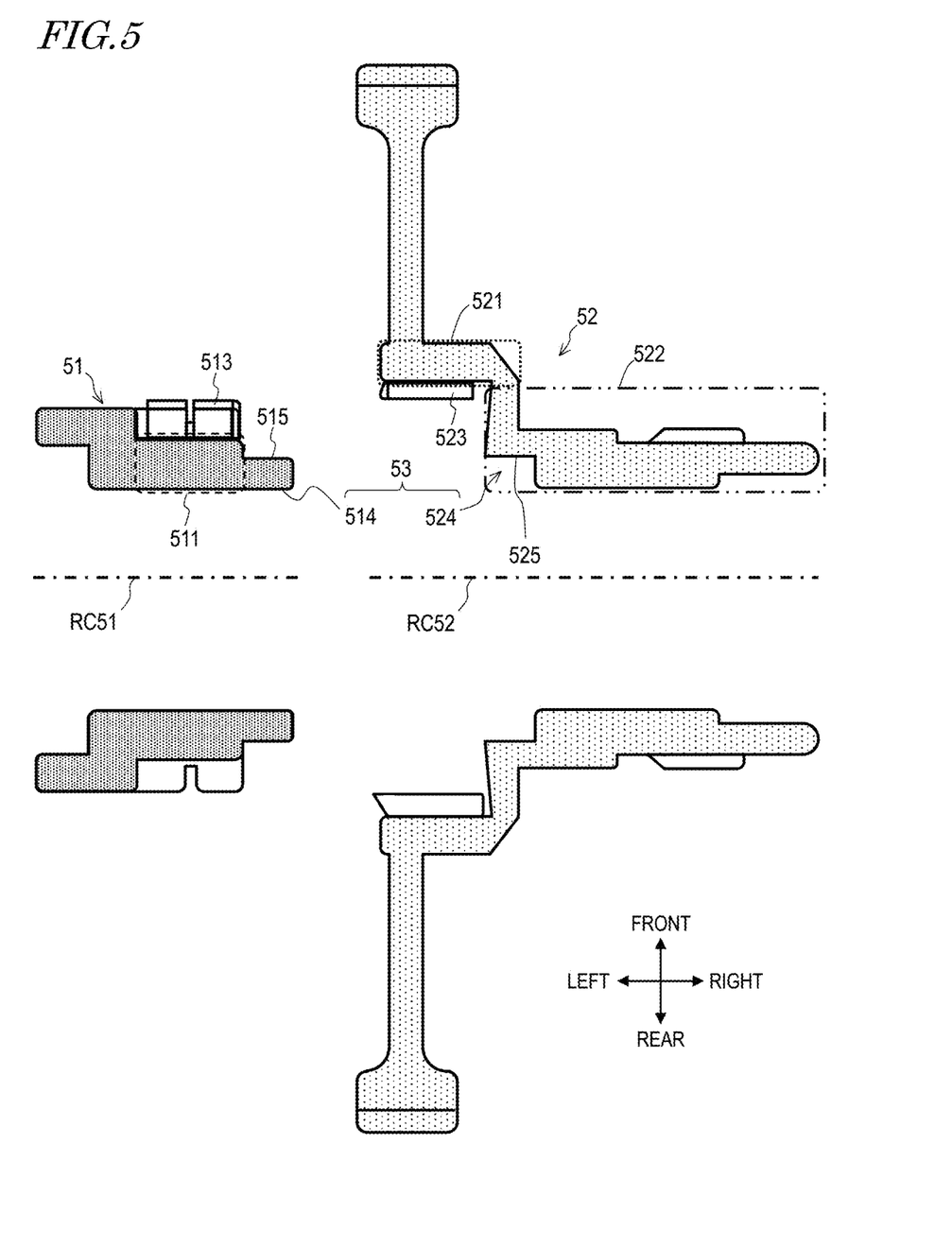
FIG. 5 is a cross-sectional view showing an inner member 51 and an outer member 52 of a one-way clutch 50 according to a preferred embodiment of the present invention in a separated state.

FIG. 4 is a cross-sectional view showing an exemplary configuration of the one-way clutch 50. FIG. 5 is a cross-sectional view showing the inner member 51 and the outer member 52 of the one-way clutch 50 in a separated state. FIG. 4 and FIG. 5 show a cross section in a plane that contains the rotation axis of the one-way clutch 50.

The one-way clutch 50 according to the present preferred embodiment includes a ratchet mechanism 501. As described above, the inner member 51 includes the plurality of clutch pawls 513 to restrict rotation of the outer member 52 relative to the inner member 51 in one direction. The outer member 52 includes the plurality of clutch teeth 523 able to engage with the plurality of clutch pawls 513. Thus, the ratchet mechanism 501 includes the plurality of clutch pawls 513 and the plurality of clutch teeth 523.

The inner member 51 includes a base 511 on which the plurality of clutch pawls 513 are provided. In FIG. 5, a portion surrounded by broken lines indicates the base 511. The plurality of clutch pawls 513 are provided in an outer peripheral portion of the base 511.

As described above, on a portion of the outer member 52 that is located outside the housing 21, the drive sprocket wheel 34 (FIG. 1) is mounted. A boss 514 protrudes from an end portion of the base 511 at which the drive sprocket wheel 34 is provided. From that end portion of the base 511, the boss 514 protrudes toward the side where the drive sprocket wheel 34 is located. In the present preferred embodiment, the drive sprocket wheel 34 is mounted to the right of the drive unit 20. Therefore, in the example shown in FIG. 4 and FIG. 5, the boss 514 protrudes in the right direction from the right end of the base 511.

The outer member 52 includes a base 521, on which the plurality of clutch teeth 523 are provided. In FIG. 5, the portion surrounded by dotted lines indicates the base 521. The plurality of clutch teeth 523 are provided in an inner peripheral portion of the base 521.

The outer member 52 includes an extension 522, on which the drive sprocket wheel 34 is mounted. In FIG. 5, the portion surrounded by chain double-dashed lines indicates the extension 522. In the example shown in FIG. 4 and FIG. 5, the extension 522 extends from the right portion of the base 521 toward the inner periphery, and thereafter extends in the right direction. The extension 522 includes a recess 524 on a side facing the inner member 51.

Figure 6:
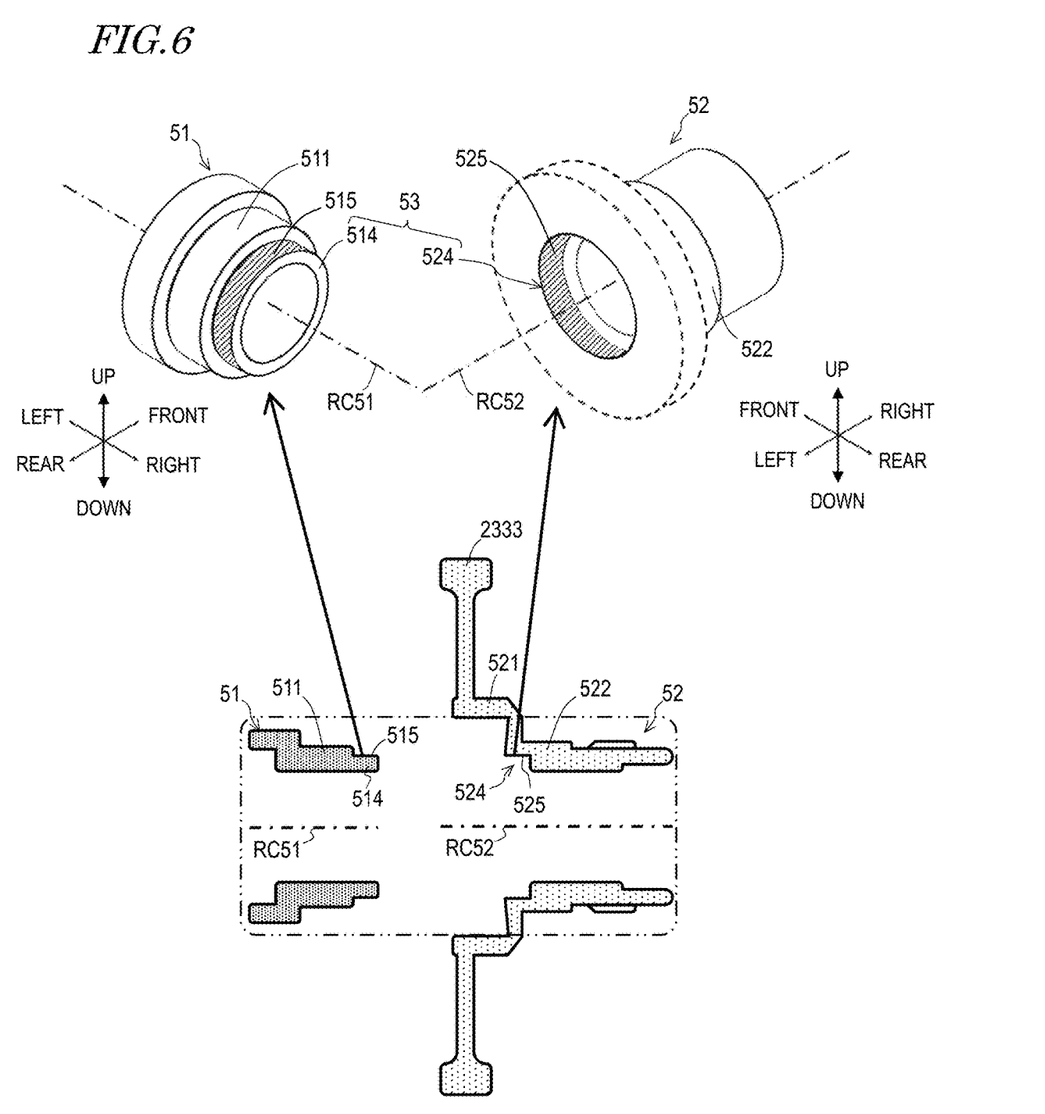
FIG. 6 is a perspective view showing a portion of an inner member 51 and a portion of an outer member 52 according to a preferred embodiment of the present invention.

FIG. 6 is a perspective view showing a portion of the inner member 51 and a portion of the outer member 52. The perspective view presented in the upper portion of FIG. 6 illustrates a range that is surrounded by chain double-dashed lines in the cross-sectional view shown in the lower portion of FIG. 6. For ease of viewing the recess 524 of the outer member 52, in the perspective view of FIG. 6, the base 521, the gear 2333, and the clutch pawls 513 and the clutch teeth 523 are omitted from illustration.

A portion of the inner member 51 shown hatched in FIG. 6 corresponds to an outer peripheral surface 515 of the boss 514. A portion of the outer member 52 shown hatched in FIG. 6 corresponds to an inner peripheral surface 525 of the recess 524. The one-way clutch 50 has a spigot joint structure 53 (FIG. 4) such that the boss 514 of the inner member 51 fits in the recess 524 of the outer member 52. The boss 514 and the recess 524 each have a shape that is axisymmetric with respect to its center axis RC51 or RC52. The outer peripheral surface 515 of the boss 514 and the inner peripheral surface 525 of the recess 524 are in contact with each other. The outer peripheral surface 515 of the boss 514 and the inner peripheral surface 525 of the recess 524 are able to slide against each other. Therefore, even when the boss 514 has been fitted in the recess 524, the outer member 52 is able to freely rotate with respect to the inner member 51, in the direction that is permitted by the one-way clutch 50. In the illustrated example, the boss 514 and the recess 524 each have a cylindrical shape, but this example is not limiting. So long as it is axisymmetric, the boss 514 may have a shape such that its outer diameter monotonically decreases from its root to tip end, for example. The inner peripheral surface 525 of the recess 524 of the outer member 52 matches the outer peripheral surface 515 of the boss 514 in terms of shape and size. Although the outer peripheral surface 515 of the boss 514 and the inner peripheral surface 525 of the recess 524 are preferably smooth, they may have minute grooves, holes, etc., on their surfaces so long as they are able to slide against each other.

The spigot joint structure 53, in which the boss 514 of the inner member 51 fits in the recess 524 of the outer member 52, allows the center axis RC52 of the outer member 52 to be aligned with the center axis RC51 of the inner member 51, or vice versa. In other words, the spigot joint structure 53 achieves center alignment between the inner member 51 and the outer member 52. As a result, even when the clutch pawls 513 and the clutch teeth 523 have a configuration that may allow center misalignment, the one-way clutch 50 is stably rotated. Since the spigot joint structure 53 may significantly reduce or prevent center misalignment between the inner member 51 and the outer member 52, even if there are as few as two clutch pawls 513 (as has been described with reference to, e.g., FIG. 3), too much force is prevented from being applied to one of the clutch pawls 513, thus allowing stable rotation. Since the outer peripheral surface 515 of the boss 514 and the inner peripheral surface 525 of the recess 524 are able to slide against each other, one of the inner member 51 and the outer member 52 is able undergo relative rotation with respect to the other, while retaining center alignment. Even if there are three or more clutch pawls 513, without the spigot joint structure 53, the center axis RC52 of the outer member 52 and the center axis RC51 of the inner member 51 might become misaligned depending on the force that is applied to the pedal crank shaft 22. Therefore, the center alignment effect provided by the spigot joint structure 53 is still valid when there are three or more clutch pawls 513.

FIG. 4 is referred to again. The boss 514 protruding from the base 511 is located closer to the pedal crank shaft 22 than to the clutch pawls 513. In other words, the outer diameter of the boss 514 is smaller than the outer diameter of the base 511. The reduced diameter of the boss 514 prevents an increase in the weight of the one-way clutch 50.

Between the extension 522 of the outer member 52 and the pedal crank shaft 22, a plain bearing 40 (FIG. 4) is provided. The plain bearing 40 may be, for example, a replaceable tubular bearing (bushing) having on its inner periphery and/or outer periphery a surface which is able to slide. On the other hand, no plain bearing is provided between the inner member 51 and the pedal crank shaft 22. With the configuration of the one-way clutch 50 according to the present preferred embodiment, the recess 524 accommodating the boss 514 eliminates the need for a plain bearing, which would otherwise be required. Thus, there is only one plain bearing 40 provided between the outer member 52 and the pedal crank shaft 22. By reducing the number of plain bearings 40, the cost of parts is reduced.

Now, a configuration that does not conform to the present preferred embodiment will be described. Suppose that the member that is linked to the second end 231R of the connecting shaft 231 is the outer member of the one-way clutch. In this case, it is the inner member of the one-way clutch that has the drive sprocket wheel mounted to its right side. Since the extension will begin from the right side of the inner member, the inner member will have an increased length along the direction of the rotation axis, in this case, one plain bearing will not suffice. On the other hand, according to the present preferred embodiment, the inner member 51 is linked to the connecting shaft 231, which rotates together with the pedal crank shaft 22, and no plain bearing is needed between the inner peripheral surface of the inner member 51 and the outer peripheral surface of the pedal crank shaft 22. This allows the number of plain bearings 40 to be reduced, thus decreasing the cost of parts.

A gap 56 is provided between the inner peripheral surface of the inner member 51 and the outer peripheral surface of the pedal crank shaft 22. The inner member 51 and the pedal crank shaft 22 are not in contact with each other. Since contact between the inner peripheral surface of the inner member 51 and the outer peripheral surface of the pedal crank shaft 22 is avoided, a step of polishing the outer peripheral surface of the pedal crank shaft 22 to a slidable level is able to be omitted. This reduces production costs.

Figure 7:
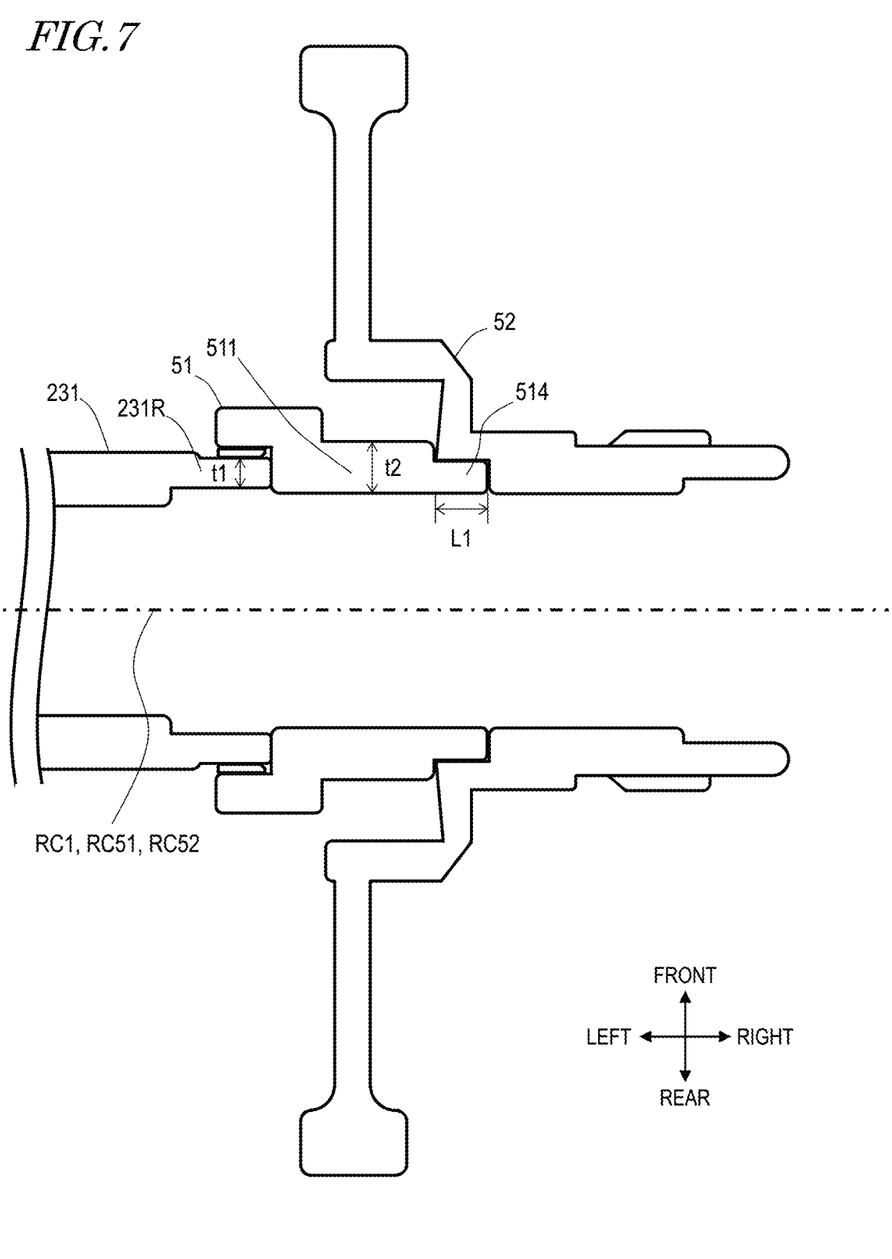
FIG. 7 is a diagram showing the sizes of a base 511 and a boss 514 of an inner member 51 according to a preferred embodiment of the present invention.

Next, with reference to FIG. 7, the sizes of the base 511 and the boss 514 of the inner member 51 will be described. FIG. 7 is a diagram showing the sizes of the base 511 and the boss 514 of the inner member 51.

As described above, the boss 514 protrudes in the right direction from the right end of the base 511. The length L1 of the boss 514 along a direction parallel to the center axis RC51 of the inner member 51 is about 2 mm or more, for example. The length L1 of the boss 514 is, e.g., about 2 to about 4 mm, although this is not limiting. The recess 524 of the extension 522 has a shape and size that provides an accurate center alignment by accommodating the boss 514 of the inner member 51. The depth of the recess 524 along a direction parallel to the center axis RC52 of the outer member 52 matches the length L1 of the boss 514. In the present preferred embodiment, the depth of the recess 524 along a direction parallel to the center axis RC52 of the outer member 52 is slightly smaller than the length L1 of the boss 514. Therefore, the tip end of the boss 514 may abut with the bottom of the recess 524. In the present preferred embodiment, sliding is also possible between the tip end of the boss 514 and the bottom of the recess 524. Alternatively, the depth of the recess 524 along a direction parallel to the center axis RC52 of the outer member 52 may be greater than the length L1 of the boss 514. In that case, the right end of the base 511 (i.e., the root end of the boss 514) of the inner member 51 may abut with the left end of the extension 522 of the outer member 52.

A greater length of the boss 514 enhances the function of significantly reducing or preventing misalignment between the center axes due to inclination the inner member 51 and the outer member 52. Moreover, about 1 mm of play along the crank shaft direction may be expected between parts within the drive unit 20, even in the presence of such play, the boss 514 is able to be prevented from becoming disengaged from the recess 524.

The thickness t2 of the base 511 is larger than the thickness t1 of the connecting shaft 231 at its second end 231R. The thickness t2 is defined as a difference between the outer diameter and the inner diameter of the base 511. The thickness t1 is defined as a difference between the outer diameter and the inner diameter of the connecting shaft 231 at the second end 231R. In a configuration in which there are as few clutch pawls 513 as, e.g., two, a larger force will apply to each clutch pawl 513 than in the case in which there is a plurality of clutch pawls 513. This large force also applies to the base 511 via the clutch pawls 513. The large thickness t2 of the base 511 increases the strength of the base 511 (on which the clutch pawls 513 are provided), without being constrained by the mechanical properties of the connecting shaft 231, on which a magnetostrictive torque sensor is mounted. Therefore, even if there are two clutch pawls 513, for example, the base 511 has sufficient strength to withstand the large force that may be applied through each individual clutch pawl 513.

Preferred embodiments of the present invention have been described above. However, the present invention is not to be limited to the above-described preferred embodiments. For example, although the above-described preferred embodiments illustrate an electrically assisted bicycle including a suspension, preferred embodiments of the present invention can also be suitably used for an electrically assisted bicycle that lacks suspensions.

Although the above-described preferred embodiments illustrate a drive unit of a type in which a human force and an assistance force of the electric motor 25 are merged at an element that rotates coaxially with the pedal crank shaft 22 (merge-at-crank type), preferred embodiments of the present invention are not limited thereto. Preferred embodiments of the present invention are also suitably applicable to drive units of a type in which a human force and an assistance force are merged by a chain (merge-at-chain type). In the case of a merge-at-chain type, the outer member 52 does not have a gear 2333 to receive the assisting driving power from the electric motor 25. Since the gear 2333 has a large diameter, it is likely to exert a force on the outer member 52 that may cause an axial misalignment. The spigot joint structure 53 in the above-described preferred embodiments may provide a particularly outstanding effect in the case where such a large-diameter gear 2333 is linked to the outer member 52.

Although the above-described preferred embodiments illustrate a one-way clutch that includes two clutch pawls, any other type of one-way clutch may be used. For example, a one-way clutch may be used which includes four or more clutch pawls but in which only the two clutch pawls that are located diametrically across the inner member engage with the clutch teeth at any given time. In a drive unit using such a one-way clutch, too, the one-way clutch is stably rotated in the manner described above.

In the above-described preferred embodiments, the electric motor 25 is accommodated in a recess that is provided in the first case 211 (FIG. 2) of the housing 21; however, the structure of the housing 21 is not limited thereto. For example, an aperture may be provided in the left portion of the first case 211 through which the electric motor 25 is inserted, and through this aperture, the electric motor 25 may be mounted to the housing 21. In that case, the aperture may be furnished with a cover to make the first case 211 dust-proof and water-proof.

Thus, illustrative preferred embodiments of the present invention have been described above.

A drive unit 20 according to a preferred embodiment of the present invention is mountable to a body frame 12 of an electrically assisted bicycle 10 to generate a driving power which is transmitted to a wheel 14R of the electrically assisted bicycle. The drive unit 20 includes a housing 21; an electric motor 25 fixed to the housing 21; and a pedal crank shaft 22 extending through the housing 21 along the right-left direction of the electrically assisted bicycle 10 and that is rotatably supported by the housing 21. A tubular connecting shaft 231, through which the pedal crank shaft 22 extends, transmits a pedaling force from a first end 231L to a second end 231R thereof, the first end 231L being coupled to the pedal crank shaft 22; and a one-way clutch 50 transmits the pedaling force having been transmitted to the second end 231R of the connecting shaft 231 to a drive sprocket wheel 34. The one-way clutch 50 includes an inner member 51 linked to the second end 231R of the connecting shaft 231, and an outer member 52 linked to the drive sprocket wheel 34. The inner member 51 includes a plurality of clutch pawls 513 to restrict rotation of the outer member 52 relative to the inner member 51 in one direction, a base 511 on which the plurality of clutch pawls 513 are provided, and a boss 514 protruding from one end of the base 511 toward the side where the drive sprocket wheel 34 is located, the boss 514 causing a center axis RC52 of the outer member 52 to be aligned with a center axis RC51 of the inner member 51. The outer member 52 includes a plurality of clutch teeth 523 able to engage with the plurality of clutch pawls 513, and an extension 522 coupled to the drive sprocket wheel 34. The extension 522 includes a recess 524 to accept the boss 514 at an inner member 51 side thereof. The recess 524 has an inner peripheral surface 525 that is able to slide against an outer peripheral surface 515 of the boss 514.

Providing a spigot joint structure 53 of "boss 514/recess 524" between the inner member 51 and the outer member 52 of the one-way clutch 50 achieves center alignment between the inner member 51 and the outer member 52. As a result, even when the clutch pawls 513 and the clutch teeth 523 have a configuration that may experience a center misalignment, the one-way clutch 50 is stably rotated. Since the outer peripheral surface 515 of the boss 514 and the inner peripheral surface 525 of the recess 524 are able to slide against each other, while achieving center alignment, one of the inner member 51 and the outer member 52 is able to undergo relative rotation with respect to the other.

In a preferred embodiment of the present invention, a size of the boss 514 along a direction parallel to the center axis RC51 of the inner member 51 may be about 2 mm or more. A greater size (length) of the boss 514 enhances the function of significantly reducing or preventing misalignment between the center axes due to inclination the inner member 51 and the outer member 52. Moreover, about 1 mm of play along the crank shaft direction may be expected between parts, and even in the presence of such play, the boss 514 is prevented from becoming disengaged from the recess 524.

In a preferred embodiment of the present invention, of the inner member 51, a thickness (t2) that is defined by a difference between an outer diameter and an inner diameter of the base 511 may be greater than a thickness (t1) that is defined by a difference between an outer diameter and an inner diameter at the second end 231R of the connecting shaft 231. This increases the strength of the base 511 (on which the clutch pawls 513 are provided), without being constrained by the mechanical properties of the connecting shaft 231, on which a magnetostrictive torque sensor is mounted. Therefore, even if there are two clutch pawls 513, for example, the base 511 has sufficient strength to withstand the large force that may be applied through each individual clutch pawl 513.

In a preferred embodiment of the present invention, when the inner member 51 rotates the outer member 52, only two of the plurality of clutch pawls 513 that are located diametrically across the inner member 51 may be able to engage with corresponding ones of the plurality of clutch teeth 523. Since the spigot joint structure 53 significantly reduces or prevents center misalignment between the inner member 51 and the outer member 52, even if there are as few as two clutch pawls 513 to engage, too much force is prevented from being applied to one of the clutch pawls 513, thus allowing stable rotation.

In a preferred embodiment of the present invention, the number of clutch pawls 513 of the inner member 51 may be two. The one-way clutch 50 has a simple configuration, and therefore is reduced in weight. In addition, the number of parts in the one-way clutch 50 is reduced and also assembly of the one-way clutch 50 is simplified, thus reducing costs.

In a preferred embodiment of the present invention, the boss 514 may be located closer to the pedal crank shaft 22 than to the plurality of clutch pawls 513. The outer diameter of the boss 514 is smaller than the outer diameter of the base 511. The reduced diameter of the boss 514 allows the one-way clutch 50 to be reduced in weight.

In a preferred embodiment of the present invention, a plain bearing 40 may be provided between the outer member 52 and the pedal crank shaft 22; and no plain bearing may be provided between the inner member 51 and the pedal crank shaft 22. This allows the number of plain bearings 40 to be reduced, thus decreasing the cost of parts.

In a preferred embodiment of the present invention, a gap 56 may be provided between the inner peripheral surface of the inner member 51 and the outer peripheral surface of the pedal crank shaft 22. Since contact between the inner peripheral surface of the inner member 51 and the outer peripheral surface of the pedal crank shaft 22 is avoided, a step of polishing the outer peripheral surface of the pedal crank shaft 22 to a slidable level is omitted.

In a preferred embodiment of the present invention, only one plain bearing 40 may be provided between the outer member 52 and the pedal crank shaft 22. This allows the cost of parts associated with plain bearings to be further reduced.

In a preferred embodiment of the present invention, the outer member 52 may include a gear 2333 to receive an assisting driving power from the electric motor 25; and the outer member 52 may transmit to the drive sprocket wheel 34 a resultant force which combines the pedaling force having been transmitted to the second end 231R of the connecting shaft 231 and the assisting driving power from the electric motor 25. This achieves a uniaxial system in which forces are merged at the outer member 52 before being transmitted to the drive sprocket wheel 34.

An electrically assisted bicycle 10 according to a preferred embodiment of the present invention includes a drive unit 20 according to any of the above. Even when the clutch pawls 513 and the clutch teeth 523 of the one-way clutch 50 have a configuration that may allow center misalignment, an electrically assisted bicycle 10 that is able to stably rotate the one-way clutch 50 is achieved.

Preferred embodiments of the present invention are particularly useful in the fields of drive units to be incorporated in electrically assisted bicycles and electrically assisted bicycles.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A drive unit mountable to a body frame of an electrically assisted bicycle to generate a driving power which is transmitted to a wheel of the electrically assisted bicycle, the drive unit comprising:
  a housing;
  an electric motor fixed to the housing;
  a pedal crank shaft extending through the housing along a right-left direction of the electrically assisted bicycle and being rotatably supported by the housing;
  a connecting shaft through which the pedal crank shaft extends to transmit a pedaling force from a first end to a second end thereof, the first end being coupled to the pedal crank shaft; and
  a one-way clutch to transmit the pedaling force from the second end of the connecting shaft to a drive sprocket wheel; wherein
  the one-way clutch includes:
    an inner member linked to the second end of the connecting shaft; and
    an outer member linked to the drive sprocket wheel;
  the inner member includes:
    a plurality of clutch pawls to restrict rotation of the outer member relative to the inner member in one direction;
    a base on which the plurality of clutch pawls are provided; and
    a boss protruding from one end of the base toward a side where the drive sprocket wheel is located to cause a center axis of the outer member to be aligned with a center axis of the inner member;
  the outer member includes:
    a plurality of clutch teeth able to engage with the plurality of clutch pawls; and
    an extension coupled to the drive sprocket wheel;

the extension includes a recess to accommodate the boss at an inner member side thereof, and the recess has an inner peripheral surface that is able to slide against an outer peripheral surface of the boss; and the boss is located closer to the pedal crank shaft than to the plurality of clutch pawls.

2. A drive unit mountable to a body frame of an electrically assisted bicycle to generate a driving power which is transmitted to a wheel of the electrically assisted bicycle, the drive unit comprising:

a housing;

an electric motor fixed to the housing;

a pedal crank shaft extending through the housing along a right-left direction of the electrically assisted bicycle and being rotatably supported by the housing;

a connecting shaft through which the pedal crank shaft extends to transmit a pedaling force from a first end to a second end thereof, the first end being coupled to the pedal crank shaft; and a one-way clutch to transmit the pedaling force from the second end of the connecting shaft to a drive sprocket wheel; wherein the one-way clutch includes:

an inner member linked to the second end of the connecting shaft; and an outer member linked to the drive sprocket wheel;

the inner member includes:

a plurality of clutch pawls to restrict rotation of the outer member relative to the inner member in one direction;

a base on which the plurality of clutch pawls are provided; and a boss protruding from one end of the base toward a side where the drive sprocket wheel is located to cause a center axis of the outer member to be aligned with a center axis of the inner member;

the outer member includes:

a plurality of clutch teeth able to engage with the plurality of clutch pawls; and an extension coupled to the drive sprocket wheel;

the extension includes a recess to accommodate the boss at an inner member side thereof, and the recess has an inner peripheral surface that is able to slide against an outer peripheral surface of the boss; and the drive unit further includes a plain bearing positioned between the outer member and the pedal crank shaft, and no plain bearing is positioned between the inner member and the pedal crank shaft.

3. The drive unit of claim 2, wherein a gap is provided between an inner peripheral surface of the inner member and an outer peripheral surface of the pedal crank shaft.

4. The drive unit of claim 2, wherein only one plain bearing is positioned between the outer member and the pedal crank shaft.

* * * * *